(12) United States Patent
Chan

(10) Patent No.: US 6,467,180 B1
(45) Date of Patent: Oct. 22, 2002

(54) MEASURING TAPE FOR DETERMINING BRA SIZE

(75) Inventor: Benjamin Hon-Yue Chan, Riverside, CT (US)

(73) Assignee: Lunaire, Inc., New York, NY (US)

(*) Notice: Subject to any disclaimer, the term of this patent is extended or adjusted under 35 U.S.C. 154(b) by 59 days.

(21) Appl. No.: 09/628,519

(22) Filed: Jul. 31, 2000

(51) Int. Cl.[7] .............................. A41H 1/02; G01B 3/10
(52) U.S. Cl. ........................ 33/512; 33/2 R; 33/17 R; 33/759; 33/494
(58) Field of Search ......................... 33/512, 511, 755, 33/759, 494, 679.1, 551, 555.4, 2 R, 17 R

(56) References Cited

U.S. PATENT DOCUMENTS

| | | | | |
|---|---|---|---|---|
| 361,292 A | * | 4/1887 | Jackson ........................ | 33/2 R |
| 798,223 A | * | 8/1905 | Sole ............................. | 33/2 R |
| 1,624,779 A | * | 4/1927 | DeCamp et al. ............... | 33/759 |
| 2,559,501 A | * | 7/1951 | Graf ............................. | 33/512 |
| 2,575,343 A | * | 11/1951 | Heiman ........................ | 33/2 R |
| 2,946,125 A | | 7/1960 | Gittelson | |
| 3,292,261 A | * | 12/1966 | Hayes ........................... | 33/2 R |
| 3,685,155 A | * | 8/1972 | Oblander ...................... | 33/755 |
| 4,519,137 A | * | 5/1985 | O'Boyle ....................... | 33/17 R |
| 5,414,943 A | * | 5/1995 | Vogt ............................. | 33/512 |
| 5,619,804 A | * | 4/1997 | Vogt et al. ..................... | 33/763 |
| 5,965,809 A | | 10/1999 | Pechter | |
| 6,272,761 B1 | * | 8/2001 | Pechter ......................... | 33/512 |
| 6,276,069 B1 | * | 8/2001 | Chadwick et al. ............. | 33/512 |

FOREIGN PATENT DOCUMENTS

| | | | | |
|---|---|---|---|---|
| DE | 09-0773-0 | * | 3/1897 | .................. 33/2 R |
| DE | 17-1084-4 | * | 5/1906 | .................. 33/2 R |
| DE | 00-5883-0 | * | 12/1912 | .................. 33/2 R |
| DE | 10 60 608 B | | 7/1959 | |
| GB | 23-041-94 | * | 3/1997 | .................. 33/2 R |
| JP | 40-60497-03 | * | 2/1994 | .................. 33/2 R |
| JP | 08 246218 A | | 9/1996 | |

OTHER PUBLICATIONS (Product Manuel/Cataloque or other information obtained from a Web–site)Measuring for the perfect fit. Datasheet [online][retrieved on 2000–07–28]. Retrieved from the Internet.*

Jockey Bra Sizer, 1999.

* cited by examiner

*Primary Examiner*—G. Bradley Bennett
(74) *Attorney, Agent, or Firm*—Skadden, Arps, Slate Meagher & Flom LLP

(57) ABSTRACT

A tape measuring device for determining bra sizes has dimension and size markings on both the outer and inner surfaces of the tape. The dimension markings divide each surface by standard units and subunits of length—typically inches. The size markings on the outer surface allow the user to determine the proper band size for a bra based on a single measurement, without the need for any additional calculations. The size markings on the inner surface allow the user to determine the proper cup and overall bra size based on the band size determination and a measurement of circumference around the bust, again without the need for any additional calculations.

5 Claims, 4 Drawing Sheets

FRONT BAND:

| 26" | 27" | 28" | 29" | 30" | 31" | 32" | 33" | 34" | 35" | 36" | 37" | 38" | 39" | 40" | 41" | 42" | 43" | 44" | 45" | 46" |
|---|---|---|---|---|---|---|---|---|---|---|---|---|---|---|---|---|---|---|---|---|
| 32 | | 34 | | 36 | | 38 MISSY | | 38 WOMAN | | 40 | | 42 | | 44 | | 46 | | 48 | | |

FIG.1

MEASURING TAPE FOR DETERMINING BRA SIZE

BACKGROUND OF THE INVENTION

1. Field of the Invention

The present invention relates to the field of measuring and testing devices. More particularly, the invention relates to a measuring tape and system for use in quickly and accurately determining bra sizes.

2. Brief Description of the Prior Art

Bra sizing is traditionally done by determining two specific values: band size and cup size.

Band size, typically expressed in inches in the United States, is conventionally determined first by measuring the circumference around the wearer's torso immediately below the breasts (the "underbust" measurement) with a conventional tape measure then adding several—typically five—inches to arrive at the correct band size.

Cup size, typically expressed as a letter size, is conventionally determined by first taking a measurement of circumference around the wearer's torso at the "apex" or fullest part of the breasts (the "overbust" measurement) then calculating the difference between the apex or overbust measurement and the band size. By standard practice, a difference of one inch corresponds to an A cup, two inches to a B cup, three inches to a C cup, and so on.

It can be seen that this traditional method of bra sizing is complicated; the process often produces errors that result in improper size selection and poorly fitted garments. Previous inventors have sought to address this deficiency. A harness-type bust measuring apparatus having an adjustable horizontal measuring tape or strip and at least a pair of vertically disposed measuring tapes or strips trained through the horizontal tape is disclosed in U.S. Pat. No. 2,946,125. However, measurement of band, chest or torso size as necessary values to be used in the determination of cup size is not done using this device. Further, the device requires that it be worn by the user while the measurement is being made, which can be inconvenient and uncomfortable.

Another bust measuring apparatus known in the art has separate measuring tapes for taking band size and apex measurements combined into a single circular device. The device clips onto the center back strap of a person wearing a bra. After band and apex measurements are taken, cup size is found by lining up the appropriate values found for band and apex into a "conversion wheel"—a type of circular conversion table where the calculated value sought appears in a cut out window when the corresponding band and apex dimensions are lined up correctly on the face of the wheel—incorporated into One side of the device.

While some of the complexity associated with bra sizing is alleviated by allowing the user to determine bra size by "dialing" the appropriate band size and apex measurements into the conversion wheel once known, that device still requires the user to convert the previously obtained band size and apex measurements in order to arrive at the proper cup and bra size. Since this step requires that the user not only remember the measurements taken, but also to line up the corresponding measurements on the conversion wheel correctly, the possibility for error still remains significant.

Further, the user is also required to wear the device on the center of the back strap of their bra in order to obtain proper measurements, which can make using this device more time consuming, awkward, and uncomfortable to obtain bra size measurements than taking the same measurements conventionally with a single flexible tape measure.

A method where bra size is determined by direct measurement of the breast is disclosed in U.S. Pat. No. 5,965,809. The method disclosed determines cup size by directly relating it to measurement of the circumference of each unclothed (bare) breast, with a single flexible tape measure used to measure each breast laterally from the beginning of one side of the breast mound to the parastemal area medially. While this method takes some of the complexity out of bra sizing by directly measuring the breast itself, several shortcomings are evident.

The need for measurements of the bare breast may result in socially awkward situations when another person is responsible for taking the wearer's measurements, such as would commonly occur in a retail setting, since many women would not feel comfortable having a "fit specialist" put measuring tape to a bare breast in order to obtain the required dimensions.

Self-measurement of the required dimensions can also be difficult and inaccurate due to the awkwardness involved with having the wearer keep the tape positioned in the right place around the bust while taking the measurements; movement of the arms up or down can change torso measurements, so even relatively small changes in arm position can introduce significant error into the measuring process.

Additionally, a direct cross-measurement of the bare breast—regardless of who does the measuring—may not always be an accurate means of determining cup size. Since cup size is a function of capacity or volume, two women may have different cross-measurements due to differences in the position and shape of their bare (unsupported) breasts, but actually require the same sized cup.

Further, even though the breast is measured directly, a conversion calculation wherein a measurement of seven inches is converted to an "A" size, eight inches to a "B" size, nine inches to a "C" size, and so on, is still required, which increases the potential for error.

SUMMARY OF THE INVENTION

This invention provides a measuring device for determining bra sizes comprising a length of material having an outer surface and an inner surface.

In one embodiment, the outer or front surface of the measuring device is used to determine an underbust measurement, and has a set of sequential dimension and band size markings printed on it. These markings divide the front surface by standard units of length (typically inches and subunits thereof). Additional band size indicator markings printed beneath the length markings on the front surface allow the corresponding band size for each measurement to be read directly from the front surface immediately after obtaining the underbust measurement.

The inner or back surface of the measuring device is used to determine cup size and overall bra size, and has a set of sequential dimension and bra size markings printed on it. These markings divide the back surface by standard units of length (typically inches and subunits thereof). Additional bra size indicator markings printed beneath the length markings allow the corresponding bra size to be read directly from the back surface after first determining the proper band size using the front surface as described above, then taking a measurement of the apex circumference using the back surface.

The invention allows bra size to be determined quickly and accurately, without the need for calculations or conversions using a single measuring device to take two simple measurements. These and other advantages of the present invention will be apparent from the description below.

BRIEF DESCRIPTION OF THE DRAWINGS

FIG. 1 illustrates a portion of an outer or front surface of a measuring device in accordance with the intention;

DETAILED DESCRIPTION

The present invention will now be discussed, with reference to illustrations of an embodiment of the measuring device, as it would be used in the determination of bra size.

Bra size can be determined by using the outer or front side of the measuring device to first determine band size and then using the inner or back side of the measuring device to determine cup and overall bra size.

Figure 3:
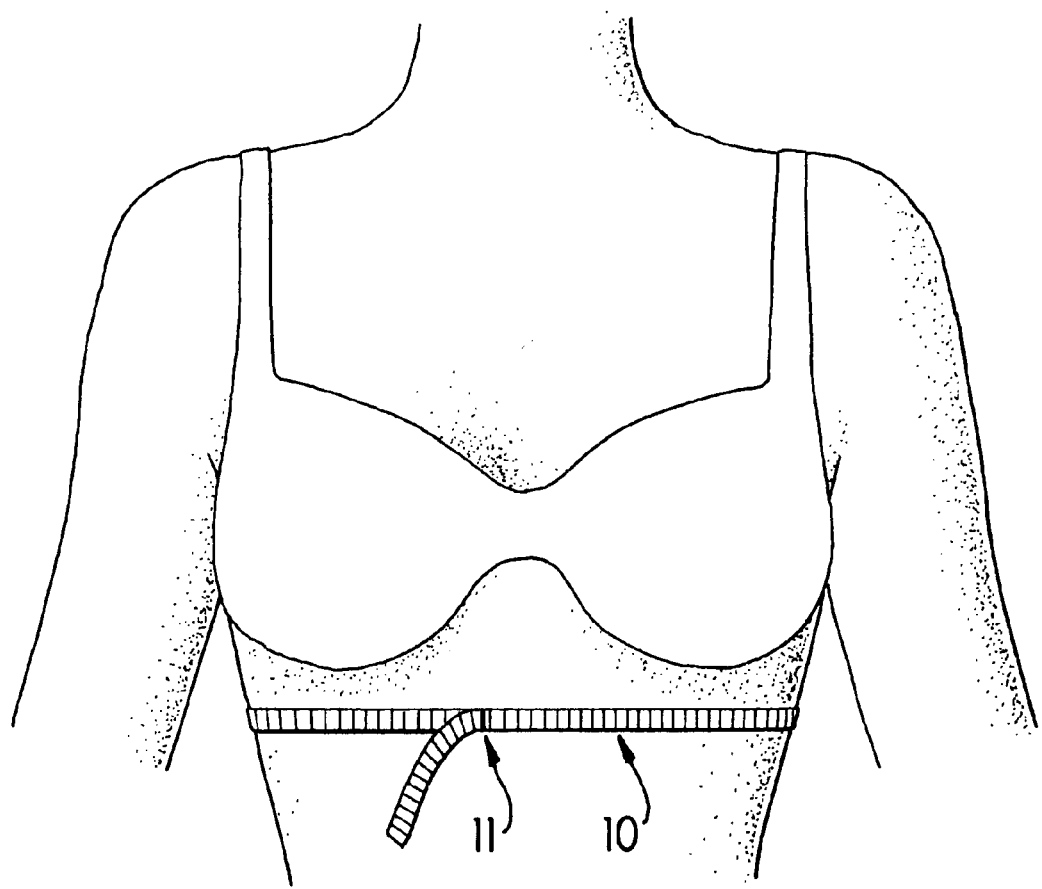
FIG. 3 is a sketch that illustrates proper location for taking an underbust measurement for determining band size using the outer or front surface of the measuring device.

With reference to FIGS. 1 and 3, band size is determined first by measuring the circumference around the wearer's torso at position 10, immediately below the breasts (the "underbust" measurement) with the outer or front side of the measuring device facing away from the wearer's body. The measuring device should be drawn so that the fit of the loop formed is snug around the torso without being uncomfortable. The underbust circumference, preferably in inches, can be obtained directly by reading the number from the top line of markings on the front surface of the measuring device at the point 11 where the starting point of the measuring device intersects the inner surface of the device, closing the loop around the torso. The band size, also preferably in inches, can be obtained directly by reading the number from the second line of markings on the front surface at the same point.

The conventional rule of thumb with respect to band size is to add a "torso factor" typically about five inches to the underbust dimension—the measured circumference around the wearer's torso immediately below the breasts. However, experience has taught that this rule overestimates the band size when used for larger, "full figured" women. As a result, a more accurate, better fitting band size for larger women is determined by adding a smaller torso factor, typically three inches instead of five, to the underbust measurement. The measuring device disclosed incorporates this feature into the band size marking scheme, so that a smaller torso factor is added to the underbust measurement to determine sizes for women wearing a certain band size, preferably, approximately thirty-eight or larger automatically, resulting in greater accuracy when determining band dimensions for larger sized women.

Figure 2:
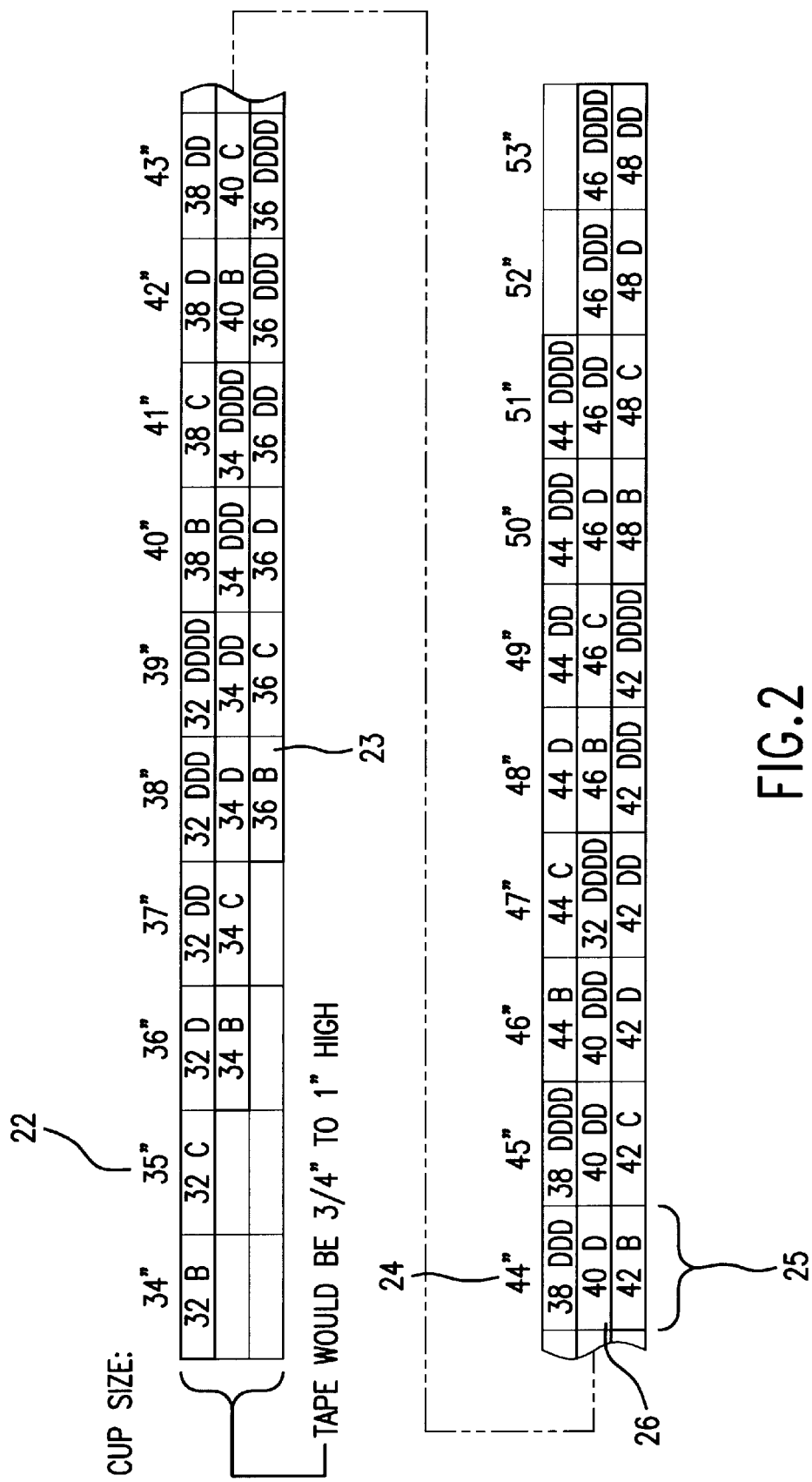
FIG. 2 illustrates a portion of an inner or back surface of a measuring device in accordance with the intention.
Figure 4:
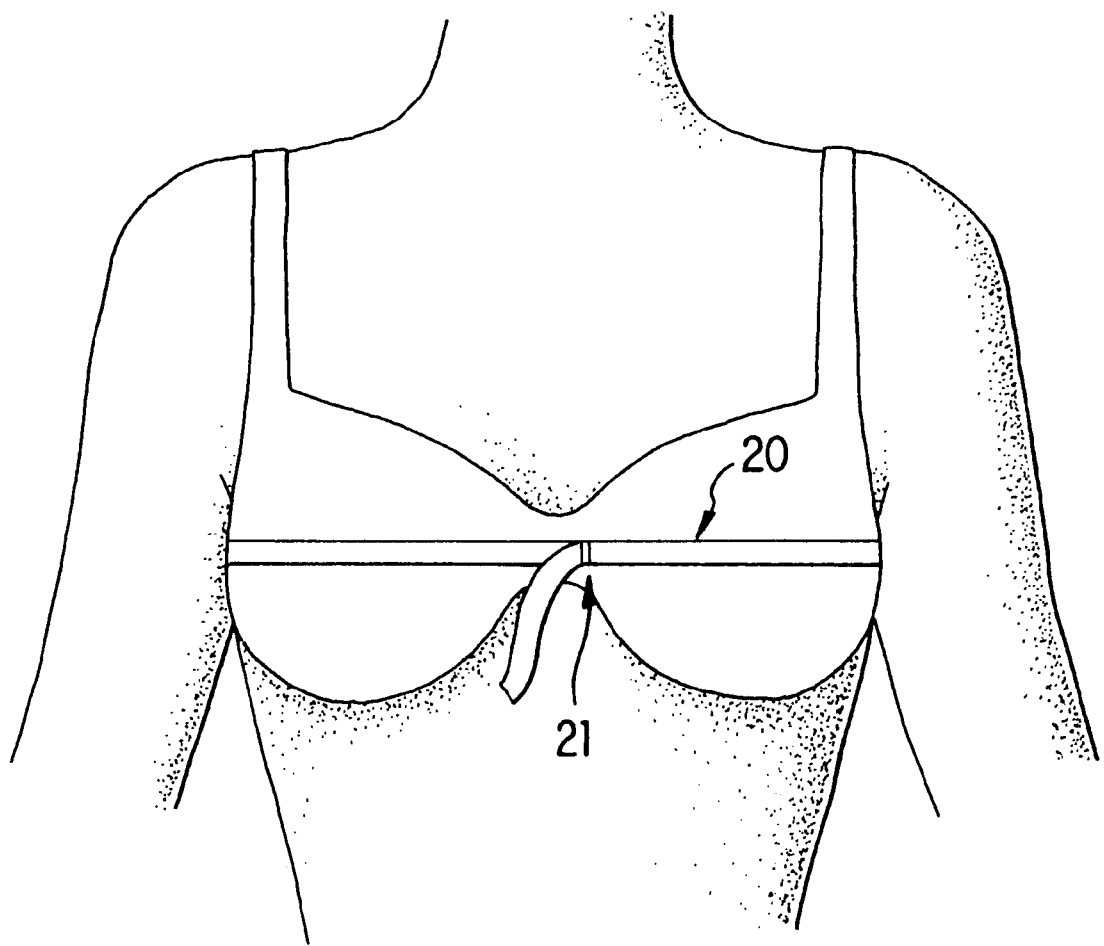
FIG. 4 is a sketch that illustrates proper location for taking an apex measurement for determining cup and overall bra size using the inner or back surface of the measuring device, in conjunction with the previously determined band size.

With reference to FIGS. 2 and 4, cup size and overall bra size can then determined using the inner or back surface of the measuring device. With the inner or back surface facing outward away from the body, the circumference of the wearer's torso at the apex or fullest part of the breasts is taken at position 20. The apex or overbust circumference 22, preferably in inches, can be obtained by directly reading the number from the top line of markings on the inner surface of the measuring device at point 21 where the starting point of the device intersects the inner surface of the device, closing the loop around the upper torso. In a column below the overbust dimension the possible band and cup sizes are listed which can be associated with any given overbust dimension. The cup size is based on the difference between the overbust and underbust dimensions. The bra size, as a number and letter combination (e.g. 34 B), can be read directly from one of the lines of markings directly beneath the overbust number 22 at point 21 on the inner surface. If no overbust measurements are printed on the band, the proper bra size is determined by finding the proper band size at point 21 where the starting point of the device intersects the inner surface of the device, closing the loop around the upper torso. The appropriate bra size is obtained by locating the correct band size, previously determined as described above, from within the group of bra size markings in the column 23 directly beneath the correct overbust measurement marking. Once the correct band size is found, the correct bra size can then be read directly from the inner surface of the measuring device.

For example, with the measurement device placed at location 10 the underbust measurement is read at location 11. If the underbust measurement is thirty-seven inches that corresponds to a band size of 40. Next the overbust measurement is performed. The measurement device is placed at location 20 and the overbust measurement is read at location 21. If the overbust measurement is forty-four inches, 24, the bra size will be chosen from the sizes in group 25, the column beneath forty-four inches, 24. The exact size will be the number and letter combination beginning with the previously determined band size. In this example the correct bra size is 40D, designated as 26.

While the measuring device has been described as including linear measurement markings on the first line of the measurement device one skilled in the art would realize that the band and bra sizes can be determined directly from the measuring device and no actual circumference measurements are required. The linear measurement markings are not necessary and could be omitted. Additionally, two separate single-sided measuring devices could be used, a first measuring device for the underbust measurement and a second measuring device for the overbust measurement.

Although the present invention was discussed in terms of certain preferred embodiments, the description is not limited to such embodiments. Rather, the invention includes other embodiments including those apparent to a person of ordinary skill in the art. Thus, the scope of the invention should not be limited by the preceding description but should be ascertained by reference to the claims that follow.

What is claimed is:

1. A measuring device for determining bra size consisting of band size and cup size for a bra comprising:

a length of material, having a first surface and a second surface;

a first set of size markings printed upon said first surface of said length of material, said markings including a series of band sizes, each band size corresponding to an underbust circumference and a torso factor; and a second set of size markings printed upon said second surface of said length of material, said second set of markings including a series of groups, each group corresponding to an overbust measurement and comprising a plurality of band sizes and associated cup sizes, said cup size being associated with said band size as a function of overbust measurement.

2. The device of claim 1 wherein said markings printed upon said first and second surfaces correspond with standard generally accepted dimensions for band and bra size.

3. The device of claim 1 wherein said torso factor varies as a function of underbust circumference.

4. The device of claim 1 wherein each said group comprises a column having at least one row, said row including a marking for a band size and a cup size.

5. A method for determining bra size consisting of a band and cup size by direct measurement comprising the steps of:

determining a band size measurement by directly measuring the torso circumference immediately below the breasts using a measurement tape having a beginning, an inner side and an outer side, said band size measurement being the torso circumference and a torso factor, said band size is read from the outer side of the tape at the point where the beginning of the measurement tape intersects the inner side of the measurement tape;

placing said measuring tape around the upper torso at the apex of the breasts to determine the overbust circumference;

said inner side of the measuring tape lists size markings corresponding to band and cup sizes, grouped by overbust measurement;

wherein the bra size is determined by finding said band size measurement from within the band and cup sizes, grouped by overbust measurement, at the point where the beginning of the measuring tape meets the inner surface of the measuring tape, and reading said band size measurement and cup size from the inner surface of the measuring tape.

* * * * *